United States Patent
Maletsky

(10) Patent No.: US 10,482,255 B2
(45) Date of Patent: Nov. 19, 2019

(54) CONTROLLED SECURE CODE AUTHENTICATION

(71) Applicant: Atmel Corporation, San Jose, CA (US)

(72) Inventor: Kerry David Maletsky, Monument, CO (US)

(73) Assignee: Atmel Corporation, San Jose, CA (US)

( * ) Notice: Subject to any disclaimer, the term of this patent is extended or adjusted under 35 U.S.C. 154(b) by 499 days.

(21) Appl. No.: 15/044,693

(22) Filed: Feb. 16, 2016

(65) Prior Publication Data

US 2017/0235956 A1    Aug. 17, 2017

(51) Int. Cl.
  *G06F 21/57*   (2013.01)
  *H04L 29/06*   (2006.01)

(52) U.S. Cl.
  CPC ............ *G06F 21/575* (2013.01); *H04L 63/06* (2013.01); *H04L 63/08* (2013.01); *H04L 63/123* (2013.01); *H04L 63/20* (2013.01); *H04L 67/42* (2013.01)

(58) Field of Classification Search
  CPC ........ G06F 21/10; G06F 21/556; G06F 21/62; G06F 2221/2119; G06F 21/575; H04L 63/0428; H04L 67/1097; H04L 63/102; H04L 63/06; H04L 63/123; H04L 63/20; H04L 67/42; H04L 63/08
  USPC ............................................................. 726/1
  See application file for complete search history.

(56) References Cited

U.S. PATENT DOCUMENTS

| | | | |
|---|---|---|---|
| 5,422,632 A | 6/1995 | Bucholtz et al. | |
| 6,212,635 B1 | 4/2001 | Reardon | |
| 6,601,172 B1 | 7/2003 | Epstein | |
| 6,704,871 B1 | 3/2004 | Kaplan et al. | |
| 6,708,273 B1 | 3/2004 | Ober et al. | |
| 6,826,690 B1 | 11/2004 | Hind | |
| 6,886,745 B2 * | 5/2005 | Berrube | G06F 3/147 235/375 |
| 6,961,858 B2 | 11/2005 | Fransdonk | |
| 6,996,710 B1 | 2/2006 | Ellison et al. | |
| 7,142,674 B2 | 11/2006 | Brickell | |
| 7,165,181 B2 | 1/2007 | Brickell | |
| 7,213,149 B2 | 5/2007 | Mache | |
| 7,369,856 B2 | 5/2008 | Ovadiam | |
| 7,430,668 B1 | 9/2008 | Chen et al. | |
| 7,584,359 B2 | 9/2009 | Karaoguz et al. | |

(Continued)

OTHER PUBLICATIONS

Edman, Matthew, 'Cryptographic Security in Wireless Networks Via Physical Layer Properties,' Doctoral Dissertation, Rensselaer Polytechnic Institute, May 2011, 141 pages.

(Continued)

*Primary Examiner* — Farid Homayounmehr
*Assistant Examiner* — Sanchit K Sarker
(74) *Attorney, Agent, or Firm* — Fish & Richardson P.C.

(57) ABSTRACT

Systems, methods, circuits and computer-readable mediums for controlled secure code authentication are provided. In one aspect, a method performed by a host device includes transmitting a request to a client device, the request including a challenge for a property of a code stored within the client device, receiving a response to the request, the response comprising information associated with the property of the code, verifying correctness of the response based on the received information, and based on the verifying of the correctness of the response, determining that the code is an authorized code.

21 Claims, 5 Drawing Sheets

(56) References Cited

U.S. PATENT DOCUMENTS

| | | | |
|---|---|---|---|
| 7,596,812 B2 | 9/2009 | Li | |
| 7,685,263 B2 | 3/2010 | Redjaian et al. | |
| 7,716,497 B1 | 5/2010 | Trimberger | |
| 7,822,204 B2 | 10/2010 | Yoshida et al. | |
| 8,165,301 B1 | 4/2012 | Bruce et al. | |
| 8,321,680 B2 | 11/2012 | Gantman et al. | |
| 8,347,374 B2* | 1/2013 | Schneider | G06F 21/305 726/12 |
| 8,555,072 B2 | 10/2013 | Camenisch et al. | |
| 9,106,479 B1 | 8/2015 | Mukerji | |
| 9,118,469 B2 | 8/2015 | Maletsky et al. | |
| 9,323,950 B2 | 4/2016 | Maletsky et al. | |
| 2002/0026578 A1 | 2/2002 | Hamann et al. | |
| 2003/0046542 A1* | 3/2003 | Chen | G06F 21/445 713/176 |
| 2003/0093663 A1 | 5/2003 | Walker | |
| 2003/0138105 A1 | 7/2003 | Challener et al. | |
| 2004/0101141 A1 | 5/2004 | Alve | |
| 2004/0216150 A1* | 10/2004 | Scheifler | G06F 21/57 719/330 |
| 2005/0005097 A1 | 1/2005 | Murakawa | |
| 2005/0066354 A1* | 3/2005 | Dellow | G06F 12/1483 725/30 |
| 2005/0122995 A1 | 6/2005 | Meyer | |
| 2006/0098824 A1 | 5/2006 | Mao | |
| 2006/0101288 A1 | 5/2006 | Smeets et al. | |
| 2006/0122937 A1 | 6/2006 | Gatto et al. | |
| 2006/0218649 A1 | 9/2006 | Brickell et al. | |
| 2006/0282901 A1 | 12/2006 | Li et al. | |
| 2007/0021141 A1 | 1/2007 | Yokota | |
| 2007/0119918 A1 | 5/2007 | Hogg et al. | |
| 2007/0123304 A1 | 5/2007 | Pattenden et al. | |
| 2007/0237366 A1 | 10/2007 | Maletsky | |
| 2008/0263357 A1 | 10/2008 | Boyen | |
| 2008/0287757 A1 | 11/2008 | Berson et al. | |
| 2009/0031141 A1 | 1/2009 | Pearson et al. | |
| 2009/0129600 A1 | 5/2009 | Brickell et al. | |
| 2009/0133113 A1* | 5/2009 | Schneider | G06F 21/305 726/12 |
| 2009/0144541 A1 | 6/2009 | Kim et al. | |
| 2009/0153901 A1 | 6/2009 | Imamura et al. | |
| 2009/0256717 A1 | 10/2009 | Iwai | |
| 2009/0292931 A1* | 11/2009 | Henry | G06F 21/72 713/190 |
| 2010/0005318 A1 | 1/2010 | Hosain | |
| 2010/0045232 A1 | 2/2010 | Chen | |
| 2010/0082984 A1 | 4/2010 | Ellison et al. | |
| 2010/0082987 A1 | 4/2010 | Thom et al. | |
| 2010/0088523 A1 | 4/2010 | Wooten | |
| 2010/0130166 A1 | 5/2010 | Tsuria et al. | |
| 2010/0158242 A1* | 6/2010 | Asher | H04L 9/0643 380/28 |
| 2010/0185864 A1 | 7/2010 | Gerdes et al. | |
| 2010/0203960 A1 | 8/2010 | Wilson et al. | |
| 2011/0099362 A1 | 4/2011 | Haga et al. | |
| 2011/0219427 A1 | 9/2011 | Hito et al. | |
| 2011/0221568 A1 | 9/2011 | Giobbi | |
| 2011/0271099 A1 | 11/2011 | Preiss | |
| 2012/0023568 A1 | 1/2012 | Cha et al. | |
| 2012/0198224 A1 | 8/2012 | Leclercq | |
| 2012/0255027 A1* | 10/2012 | Kanakapura | G06F 21/51 726/26 |
| 2013/0046547 A1 | 2/2013 | Drucker et al. | |
| 2013/0145151 A1 | 6/2013 | Brown et al. | |
| 2013/0276071 A1 | 10/2013 | Cen | |
| 2013/0276074 A1 | 10/2013 | Orsini et al. | |
| 2014/0025944 A1 | 1/2014 | Malestsky et al. | |
| 2014/0047510 A1 | 2/2014 | Belton et al. | |
| 2014/0068246 A1 | 3/2014 | Hartley et al. | |
| 2014/0089670 A1 | 3/2014 | Maletsky et al. | |
| 2014/0281554 A1 | 9/2014 | Maletsky et al. | |
| 2015/0100789 A1* | 4/2015 | Born | H04L 63/0876 713/170 |
| 2015/0339195 A1* | 11/2015 | Yang | G06F 11/1441 714/6.12 |
| 2016/0088668 A1 | 3/2016 | Kim | |
| 2016/0099814 A1* | 4/2016 | Negi | H04L 9/0841 713/171 |
| 2016/0156621 A1* | 6/2016 | Thom | H04L 63/0853 713/175 |
| 2016/0373291 A1* | 12/2016 | Dornemann | H04L 67/28 |
| 2017/0235956 A1* | 8/2017 | Maletsky | G06F 21/575 726/1 |
| 2017/0235957 A1* | 8/2017 | Maletsky | G06F 21/44 713/168 |
| 2017/0272252 A1* | 9/2017 | Leggette | H04L 9/3242 |
| 2017/0302640 A1* | 10/2017 | Maletsky | H04L 9/3247 |

OTHER PUBLICATIONS

Boneh, D., Boyen, X., and Shacham, H., "Short Group Signatures", Advances in Cryptology, CRYPTO 2004, Springer-Verlag, pp. 1-19.

Johnson, D., Menezes, A., and Vanstone, S., "The Elliptic Curve Digital Signature Algorithm (ECDSA)", Jul. 27, 2001, Springer-Verlag 2001, pp. 36-63.

USPTO Non-final Office Action in U.S. Appl. No. 13/628,946, dated Nov. 27, 2013, 12 pages.

Non-final office action for U.S. Appl. No. 13/553,388, dated Mar. 18, 2014, 12 pages.

Final office action for U.S. Appl. No. 13/628,946, dated Jun. 6, 2014, 15 pages.

Non-Final office action for U.S. Appl. No. 13/628,946 dated Dec. 4, 2014, 15 pages.

Non-Final Office Action for U.S. Appl. No. 13/800,422 dated Oct. 7, 2014, 25 pages.

Final OA for U.S. Appl. No. 13/800,422 dated Jan. 27, 2015, 25 pages.

Final Office Action for U.S. Appl. No. 13/553,388 dated Sep. 30, 2014, 18 pages.

USPTO Final Office Action in U.S. Appl. No. 13/628,946, dated Jun. 25, 2015, 15 pages.

USPTO Notice of Allowance in U.S. Appl. No. 13/800,422, dated Apr. 24, 2015, 19 pages.

How Certificates Work; Updated Mar. 28, 2003; retrieved https://technet.microsoft.com/en-us/library/Cc776447(v=WS.10).aspx on Jul. 17, 2015.

Lampson et al., "Authentication in Distributed Systems: Theory and Practice," ACM; Trans. Computer Systems 10, Nov. 4, 1992, pp. 265-310.

Non-Final Office Action for U.S. Appl. No. 13/553,388 dated Jul. 24, 2015, 18 pages.

VIPER: Verifying the Integrity of PERipherals Firmware; Yanlin Li et al.; ACM; CCS'11, Oct. 17-21, 2011.

Non-Final office action for U.S. Appl. No. 13/628,946 dated Dec. 1, 2015, 15 pages.

Final office action for U.S. Appl. No. 13/628,946 dated Jul. 18, 2016, 20 pages.

\* cited by examiner

CONTROLLED SECURE CODE AUTHENTICATION

TECHNICAL FIELD

This disclosure relates generally to code authentication, particularly to controlled secure code authentication.

BACKGROUND

In an example scenario, a method is implemented to protect codes or programs executed on devices against modification or attacks for fraudulent operation. To illustrate, in an example secure boot methodology, a processor in a device generates a digest of a boot code and uses a stored authenticate signature of the boot code to validate the digest of the boot code. However, such boot implementation is performed locally by the processor of the device, and is therefore restricted by performance, storage and security of this local processor. The security of a host/client network consequently becomes reliant on the security of the client-side processor system. Due to cost-constraints, the security of a local secure boot may be limited due to limited computational ability or lack of protection for the boot process, operating memory, and/or validating key.

SUMMARY

This specification describes systems, methods, circuits and computer-readable mediums for controlled secure code authentication. In one aspect, a method includes: transmitting a request to a client device, the request including a challenge for a property of a code of the client device, receiving a response to the request, the response comprising information associated with the property of the code, verifying correctness of the response based on the received information, and, based on the verifying of the correctness of the response, determining that the code stored within the client device is an authorized code.

The details of one or more disclosed implementations are set forth in the accompanying drawings and the description below. Other features, aspects, and advantages will become apparent from the description, the drawings and the claims.

DETAILED DESCRIPTION

System Overview

Figure 1:
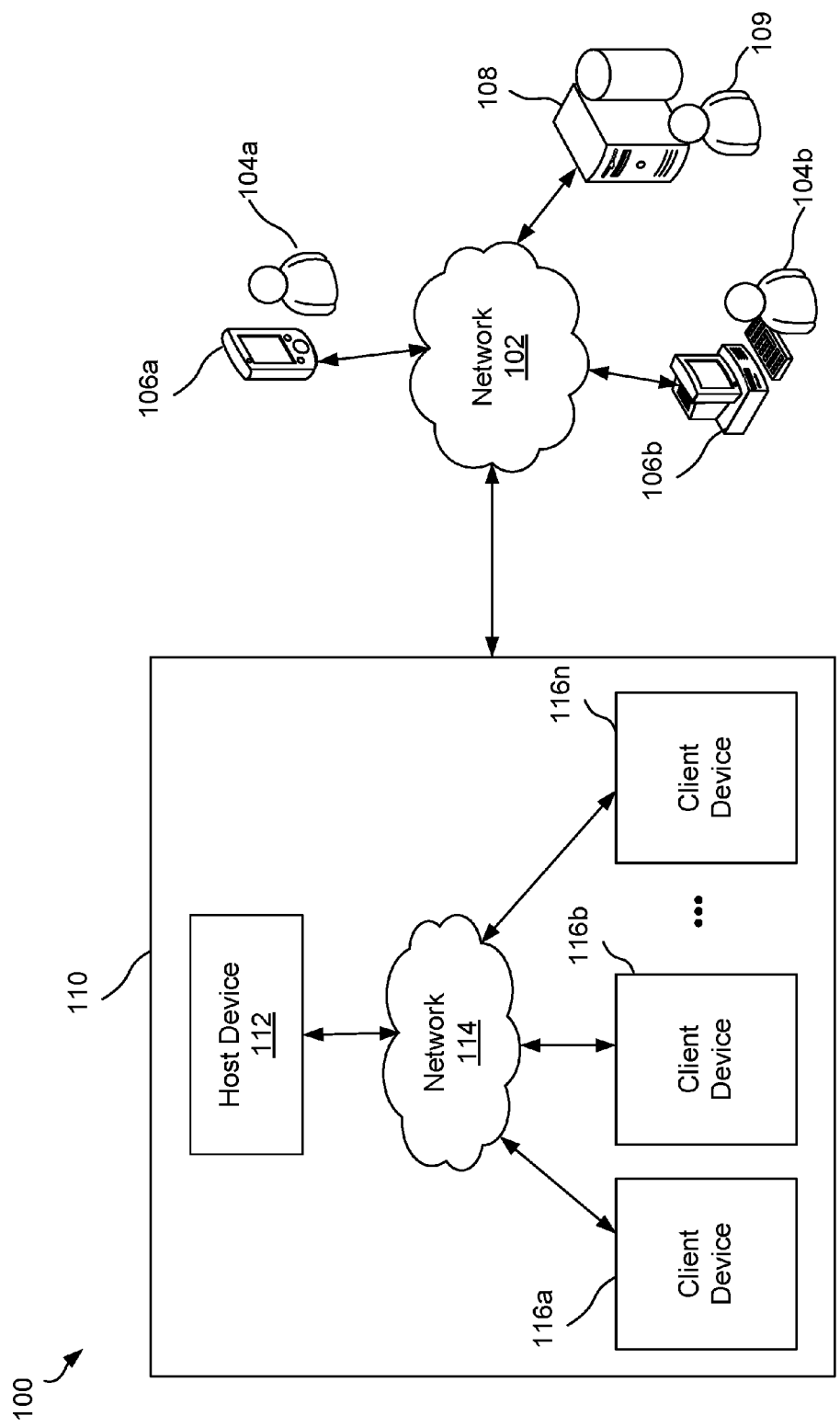
FIG. 1 is a block diagram of an example environment, according to an example embodiment.

FIG. 1 is a block diagram of an example environment 100, according to an implementation. For purposes of illustration, the environment 100 includes a system 110 having a host device 112 and "n" number of client devices 116a-116n. The host device 112 communicates with the client devices 116a-116n through a network 114, which can be, for example, a local area network for the system 110. It is noted, however, that the present technology is not limited to the implementation of a local area network; indeed, the network may be different than a local area network, such as, for example, a wide area network or a controlled area network (CAN). Additionally, the network 114 can be a wired network, a wireless network, or any combination thereof. The host device 112 is configured to validate whether codes or programs stored in the client devices are authorized (or authenticated) codes for execution by the client devices 116a-116n. A code of a client device includes at least one of a boot code or an operation code. The boot code is configured, when executed, to cause the client device to execute a boot operation. The operation code is configured, when executed, to causer the client device to perform an operation corresponding to the operation code.

In some cases, the client devices 116a-116n are unsecured or lack of security, e.g., due to constrained cost. An attacker may attack the client devices, e.g., to modify codes on the client devices 116a-116n for fraudulent purposes. In one example, the attacker modifies a boot code stored within an unsecured client device to reboot the client device without authorization. In another example, the attacker modifies an operation code stored within an unsecured client device to change an operation performed by the client device. To address these security problems, the host device 112 is configured to perform controlled secure code authentication of the client devices 116a-116n, as discussed herein with reference to FIGS. 3 and 4.

In some implementations, the host device 112 sends a request to a client device that includes a challenge for a property of a code stored within the client device, e.g., a digest of the code, a signature of the code, or a message authentication code (MAC) of the code. In some examples, the host device 112 requests a digest of the code. The client device generates the digest of the code stored within the client device. In one embodiment, the client device sends the generated digest to the host device. The host device 112 verifies the generated digest using information of an authorized code corresponding to the code stored within the client device, e.g., an authenticated signature of the code like an Original Equipment Manufacture (OEM) signature. In another embodiment, a security module in the client device computes a signature based on the generated digest and a private key stored in the security module, and sends the signature to the host device 112. The host device 112 then verifies the signature based on the information of the authorized code and/or a public key corresponding to the private key.

Based on the verification result, the host device 112 determines whether the code stored within the client device is an authorized (or authenticated) code for the client device. In some implementations, there exists a security policy between the host device 112 and the client device. For example, if a code on the client device 116a is authorized, the host device 112 allows the client device 116a to perform an operation using the code or use an authorization key. Alternatively, the host device 112 allows the client device 116a to access the network 102. If the operation code is determined by the host device 112 to be unauthorized, the host device 112 prohibits the client device 116a from accessing the network 102 (that is, isolates the client device 116a from the outside environment), and/or send a warning or notification to an entity associated with the system 110. The host device 112 can also notify the entity or the client device 116a to update the code stored within the client device 116a. In this way, fraudulent operations are minimized or eliminated, and the security of operations on the client device 116a is improved.

In some implementations, the host device 112 sends a challenge and a signature of a code to a client device. The challenge requests a digest of the code stored within the client device. In some examples, the signature is an authenticated signature of the code, e.g., an OEM signature. In some examples, the signature is generated by the host device 112 based on the code and a private key. The client device computes the digest based on the code stored within the client device. A security module of the client device can generate a signature of the digest and validate the generated signature with the received authenticated signature from the host device 112. The security module can generate the signature of the digest using a public key corresponding to the private key in the host device 112. If the generated signature is validated, in one example, the security module enables the client device, e.g., via a pin coupled to the client device; in another example, the security module allows the client device to use an authenticated key for communications with the host device 112. If the generated signature is invalid, the security module prohibits the client device to boot or perform an operation corresponding to the code. The security module can also isolate the client device from accessing the network 114.

In some implementations, the host device 112 is a trusted or secured device that has security capabilities greater than the client devices 116a-116n, as discussed with reference to FIG. 2. For example, the host device 112 includes a secure storage and/or a random number generator that may be unavailable to the client devices 116a-116n. In one embodiment, the client devices 116a-116n do not have the capabilities to include the secure storage and/or a random number generator. In another embodiment, the client devices 116a-116n do not have access to a remote secure storage and/or a random number generator. The host device 112 receives (e.g., from a remote server) and stores the secure storage information associated with one or more authorized codes (e.g., OEM boot codes and/or operation codes) for each client device. The information includes one or more of a code image of the entire authorized code, a signature of the authorized code, a digest of the authorized code, a MAC of the authorized code, or other properties of the authorized code. In some embodiments, the host device 112 stores properties of selected portions of the authorized code for secure code authentication. In some embodiments, the host device 112 stores cryptographic or secure keys for authentication (and/or authorization) with the client devices.

In some implementations, users 104a, 104b uses computing devices 106a, 106b to communicate with the system 110 including the host device 112 and/or the client devices 116a-116n over a network 102. The computing devices 106a, 106b each are a computing device such as a mobile device, a laptop computer, a desktop computer, a smartphone, a personal digital assistant, a portable media player, a tablet computer, or any other computing device that can be used to communicate with the system 110. For illustration purposes, in FIG. 1 the computing device 106a is depicted as a mobile device and the computing device 106b is depicted as a desktop computer. The network 102 is an external network for the system 110, e.g., a public communication network (e.g., the Internet, cellular data network, dialup modems over a telephone network), a wide area network (WAN), a local area network (LAN), a controlled area network (CAN), a private communications network (e.g., private LAN, leased lines), or any appropriate combination thereof. The network 102 is communicatively coupled to or integrated with the internal network 114.

In some examples, the user 104a or 104b is an entity associated with the system 110. The user 104a or 104b uses the computing device 106a or 106b to check a status of the system 110 or remotely control an operation of the system 110 through the network 102 and/or the network 114. For example, the user 104a or 104b uses the computing device 106a or 106b to check whether a code (an operation code or a boot code) stored within a client device in the system 110 is an authorized code for the client device.

In some implementations, the user 104a or 104b uses the computing device 106a or 106b to send a request to the host device 112 that performs secure code authentication on the client device and returns an authenticated result back to the computing device 106a or 106b. Based on the received authenticated result, the user 104a or 104b can determine whether to accept messages or information from the client device.

In some implementations, the user 104a or 104b uses the computing device 106a or 106b to perform secure code authentication of the client device. The computing device 106a or 106b includes a secured or trusted device that stores information of the authorized code for the client device, similar to the host device 112. The computing device 106 queries the client device to validate whether the code on the client device is authorized using the stored information.

In some implementations, a server computing system 108 is in communication with the system 110 through the network 102. The server computing system 108 includes one or more computing devices and one or more machine-readable repositories or databases. The server computing system 108 is configured to communicate with a number of systems including the system 110. For each system, the server computing system 108 stores respective codes for respective client devices and/or host devices in the system.

A user 109, e.g., an administrator or an operator, of the server computing system 108, uses the server computing system 108 to communicate with an individual system such as the system 110, e.g., to check a status of the system or to control an operation of the system. Similar to the user 104a or 104b, the user 109 can either use the server computing system 108 to directly control one of the client devices in the system 110 (e.g., through the networks 102 and 114) or use the server computing system 108 to indirectly control the client device by causing the host device 112 in the system 110 to control the client device. For example, the server computing system 108 communicates with the host device 112 through the network 102 and the host device 112 communicates with the client device through the network 114.

The disclosed implementations can be used in different environments. For example, in some implementations, the environment 100 is a car environment. The system 110 is a car. The host device 112 can be a central computing system of the car, e.g., an electronic control unit (ECU). The client devices 116a-116n each can be a controller (e.g., an ECU) for a component in the car, e.g., a window controller, a brake controller, or a wheel controller. The network 114 can be a wired or wireless network connecting the host device 112 with each of the client devices 116a-116n. The user 104a or 104b can be an owner of the car and communicate with the car using a mobile phone 106a or a computer 106b through the network 102 and/or the network 114. The server computing system 108 can be a server configured to control a number of cars and associated with an entity, e.g., a car manufacturer, a car dealer, or an enterprise.

It is appreciated that the disclosed implementations are not limited to the car environment and may be applicable in other contexts. For example, the system 110 can be a home network including a central controller for controlling a number of appliances, e.g., lamps, alarms, garage openers, or sensors.

In some examples, a digest is associated with a cryptographic hash function. A device, e.g., the host device 112 or the client device 116a, 116b, or 116n, takes an arbitrary block of data, e.g., a code or program, and uses the cryptographic hash function to compute a string, the (cryptographic) hash value. The data to be encoded may be referred to as the "message," and the hash value may be referred to as the "message digest", or simply as the "digest". The cryptographic hash function can include, for example, a Secure Hash Algorithm (SHA) such as SHA-256 or a MD5 message-digest algorithm. The generated digests can have a fixed length or different lengths. It is noted, however, that the present technology is not limited to the implementation of such an example algorithm, and that other types of hash functions may be implemented.

In some examples, a signature is a mathematical scheme for demonstrating authenticity of a digital message, e.g., a digest of a code. The signature can be associated with a digital signature algorithm. (DSA), e.g., an Elliptic Curve Digital Signature Algorithm (ECDSA). A device can use the DSA to compute or generate a signature of a digest using the digest and a key, e.g., a private key. It is noted, however, that the present technology is not limited to the implementation of such an example algorithm, and that other types of signature algorithms may be implemented.

In some examples, an authorized code for a device represents an original code without change or modification, e.g., as intended by an Original Equipment Manufacture (OEM) of the device or an entity associated with the device. A code is an authorized code when unchanged or unmodified and is unauthorized code when changed or modified. The terms "authorized code" and "authenticated code" can be interchangeably used.

Example Host and Client Devices

Figure 2A:
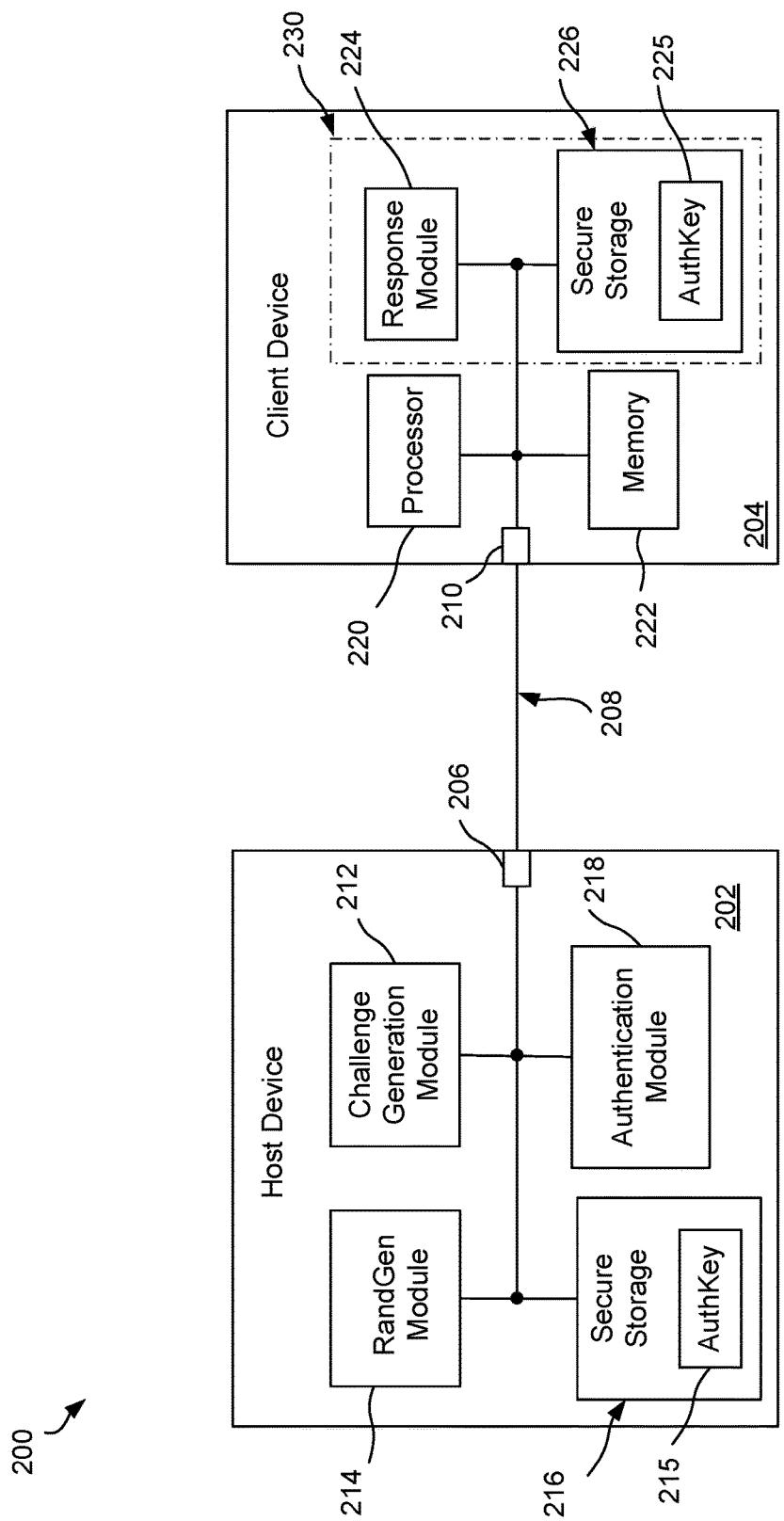
FIG. 2A is a block diagram of an example system including an example host device performing controlled secure code authentication of an example client device, according to an example embodiment.

FIG. 2A is a block diagram of an example system 200, according to an implementation. In this example implementation, an example host device 202 performs controlled secure code authentication on the client device 204. The host device 202 can be similar to the host device 112 of FIG. 1, or can be included in the computing device 106a or 106b of FIG. 1 or the server computing system 108 of FIG. 1. The client device 204 can be similar to the client device 116a, 116b, or 116n of FIG. 1. The host device 202 is configured to verify whether a code stored within the client device 204 is an authorized code to perform a corresponding operation. In some cases, the operation is performed on the client device, e.g., a booting operation. In some cases, the operation is performed on a device or system coupled to the client device 204.

The host device 202 is coupled to the client device 204 using a connection 208. The connection 208 can be similar to the network 102 of FIG. 1, the network 114 of FIG. 1, or a combination thereof. In some implementations, where the client device 204 and the host device 202 are remote to one another, the connection 208 may be a network connection (e.g., the network 102 and/or the network 114). For example, the connection 208 may be through a circuit-switched data network, a packet-switched data network, a Local Area Network (LAN), a controlled area network (CAN) or any other network able to carry data, for example, Internet Protocol (IP)-based or asynchronous transfer mode (ATM)-based networks, including wired or wireless networks. In some other implementations, where the client device 204 and the host device 202 are located close together, the connection 208 may be a data cable. In yet other implementations, where the client device 204 and the host device 202 are physically coupled (wired), the connection 208 may be a hardware interface, such as a PCI interface to a motherboard.

In some implementations, the host device 202 includes, among other components, a host interface 206, a challenge generation module 212, a random generation module 214, a secure storage 216, and an authentication module 218. In some implementations, the secure storage 216 is external to the host device 202 and securely coupled to the host device 202. For example, the secure storage 216 can be in a trusted third party entity. The host device 202 can retrieve information from the secure storage 216.

The host interface 206 is configured to enable the host device 202 to communicate with the client device 204. In some implementations, the host interface 206 may be a network interface that connects the host device 202 with a remote client device through a network. For example, the host interface 206 may include an Ethernet port, IEEE 802.11 chip, Bluetooth™ hardware, or a piece of software, such as software radio. In some other implementations, the host interface 206 may be an electrical interface that is configured to provide a physical coupling between the host device 202 and the client device 204. For example, the host interface 206 may be a Universal Serial Bus (USB) interface, external serial AT Attachment (eSATA) interface, IEEE 1394 (Firewire) interface, Thunderbolt interface, or a Lightning interface.

The challenge generation module 212 is configured to generate challenges for the client device 204. The challenge generation module 212 can generate different challenges for the client device 204 at different times. A challenge can include a query to the client device 204 for requesting a property of a code of the client device 204. The property can be a cryptographic property, e.g., a digest, a signature, a checksum, or a message authentication code (MAC). A challenge can also include a request for a property of a particular portion of the code. In some examples, the particular portion corresponds to a memory address range (physical or virtual), e.g., an address pair including a starting address and an ending address, a middle address with a width, a starting address with a width, or an ending address with a width. The challenge can include data indicating the memory address range to represent the particular portion. In some implementations, a challenge includes information associated with cryptographic or authentication keys for secure authentication and/or authorization.

The random generation (RandGen) module 214 is configured to generate a random number used as a seed for cryptographic operations performed by the host device 202. For example, the random generation module 214 may include a random number generator that returns a certain number of random bytes (e.g., 32 random bytes) to the challenge generation module 212. In some implementations, the challenge generation module 212 combines this generated random number with a separate input number to form a cryptographic "nonce" that is stored within the host device 212 and may be used by subsequent commands. The host device 202 can send the client device 204 a nonce (e.g., together with a challenge) and verify whether a response from the client device 204 includes information associated with the nonce. In such way, the host device 202 can ensure that a response to a challenge has not been copied by an attacker and replayed a subsequent time. The random generation module 214 can be included in the challenge generation module 212.

In some examples, a nonce is an arbitrary number that is used only once in a cryptographic communication between devices. The nonce may be a random or pseudo-random number issued in an authentication protocol to ensure that old communications cannot be reused in replay attacks. A nonce also may be used to ensure security for a stream cipher. To ensure that a nonce is used only once, it can be time-variant (including a suitably fine-grained timestamp in its value), or generated with enough random bits to ensure a probabilistically insignificant chance of repeating a previously generated value.

The secure storage 216 is configured to store secure information including information of an authorized code for the client device 204 and/or authentication keys (AuthKey) 215. The authorized code corresponds to a code of the client device 204. The authentication keys 215 can include a symmetric cryptographic key or an asymmetric cryptographic key for authentication or cryptographic functions. The information of the authorized code can include an entire copy (or image) of the authorized code, a digest of the authorized code, a signature of the authorized code, a MAC of the authorized code, or any other properties of the authorized code. The entire image of the authorized code can be stored in the secure storage 216 during a phase of production of the host device 202 such as manufacturing, factory initialization, personalization, or distribution. The entire image of the authorized code can be also copied or downloaded from a source such as (secure) hardware or a (secure) server. The host device 202 can establish a secure channel with the source to receive the entire image, e.g., without receiving a signature of the image. The host device 202 can also update the stored information of the authorized code from the source.

In some implementations, the signature of the authorized code is an Original Equipment Manufacture (OEM) signature for the client device, which can be stored in the host device 202 during the phase of production of the host device 202, or copied, downloaded, or updated to the host device 202 after the phase of production. In some examples, the host device 202 generates the signature of the authorized code based on the digest of the authorized code using a digital signature algorithm with a secure key. The secure key can be stored as an authentication key 215 in the secure storage 216 together with the information of the authorized code. In some examples, the host device 202 verifies the OEM signature using the generated signature based on an entire image of the authorized code.

In some implementations, the information of the authorized code includes information of one or more individual portions of the authorized code, such as a copy of an individual portion, a digest or a signature of the individual portion, or an address range of the individual portion. In some implementations, the host device 202 selects (e.g., randomly) a number of portions from the entire image of the authorized code, computes a respective digest for each portion using a cryptographic hash function or a hash algorithm, and stores the digests of the portions in the secure storage 216. The host device 202 can also calculate a respective signature for each portion using the respective digest and store the signatures in the secure storage 216. In some implementations, the host device 202 determines a respective address range for each portion or a digest of each portion, stores the address ranges of the portions in the secure storage 216, and associates the respective address ranges with the respective digests or signatures of the portions in the secure storage 216.

The secure storage 216 can be a portion of the host device 202 that implements strong security mechanisms such that the data included in the secure storage 216 is not easily copied, cloned or modified, and any unauthorized change to the data within is detectable by a verifying device. In some implementations, the secure storage 216 includes persistent or nonvolatile memory such as a read-only memory (ROM), an electronically erasable read-only memory (EEPROM) array, a flash memory, a hard drive, or any other suitable storage mechanism that is configured for storing data in a persistent manner. As indicated previously, the secure storage 216 may be used for storing information associated with the authorized code of the client device 204, authentication keys 215, miscellaneous read/write, read-only or secret data, consumption logging, and security configuration. Access to the various sections of the secure storage 216 may be restricted in a variety of ways and then the configuration locked to prevent changes.

In some implementations, the secure storage 216 includes ephemeral memory used for temporary storage of data. For example, the ephemeral memory may be a static random access memory (SRAM) where downloaded or updated images of authorized codes are buffered during secure communications with a secure source or results of cryptographic or authentication operations are buffered during secure communications with the client device 204. In one embodiment, the secure storage includes an SRAM backed up with a power source, e.g., a battery or a capacitor. In some implementations, the ephemeral memory is used to store the input command or output result and intermediate computation values. The entire contents of the ephemeral memory may be invalidated whenever the secure storage 216 goes into sleep mode or the power is removed.

The authentication module 218 is configured to verify responses to challenges from the client device 204 to determine whether a code stored within the client device 204 is an authorized code. The authentication module 218 is configured to communicate with and obtain information from the secure storage 216, the challenge generation module 212, and/or the random generation module 214. For example, the challenge generation module 212 sends a challenge for requesting a cryptographic property of the code to the client device 204. The client device 204 may send back a response including a cryptographic property of the code. The authentication module 218 can obtain the cryptographic property of an authorized code corresponding to the code of the client device 204 from information associated with the authorized code stored in the secure storage 216, and determine whether the cryptographic property of the code received in the response matches with the obtained cryptographic property of the authorized code. If the cryptographic property of the code matches with the obtained cryptographic property of the authorized code, the authentication module 218 can determine that the code stored within the client device 204 is the authorized code. If the cryptographic property of the code does not match with the obtained cryptographic property of the authorized code, the authentication module 218 can determine that the code is not the authorized code or unauthorized.

In some implementations, the client device 204 includes, among other components, a client interface 210, a processor 220, and memory 222. The client interface 210 is configured to enable the client device 204 to communicate with the host device 202. In some implementations, the client interface 210 is a network interface that connects the client device 204 with a remote host device through a network. For example, the client interface 210 may include an Ethernet port, IEEE 802.11 chip, Bluetooth™ hardware, or a piece of software, such as software radio. In some other implementations, the client interface 210 is an electrical interface that is configured to provide a physical coupling between the client device 204 and the host device 202. For example, the client interface 210 may be a Universal Serial Bus (USB) interface, external serial AT Attachment(eSATA) interface, IEEE 1394 (Firewire) interface, Thunderbolt interface, or a Lightning interface.

The memory 222 is configured to store one or more codes including a boot code and/or an operation code. The processor 220 is configured to perform booting and/or operations using the corresponding codes. The memory 222 can be an internal memory of the processor 220. A code and/or information associated with the code (e.g., an OEM signature of the code) can be stored in the memory 222 during a phase of production of the client device 204 such as manufacturing, factory initialization, personalization, or distribution. The code and/or associated information can be also copied or downloaded from a secure source such as secure hardware or a secure server. The secure source can include the host device 202. The client device 204 can also update the code and/or associated information from the secure source.

The client device 204 may be unsecured or lack of security. For example, the memory 222 may be unsecured, and the code and/or associated information stored in the memory 222 may be modified by an attacker. The host device 202 can be used to authenticate whether the code stored within the client device 204 is an authorized code.

In some implementations, the client device 204 includes a response module 224 configured to response to challenges or queries from the host device 202. The response module 224 can be included in the processor 220. In some cases, the client device 204 receives, from the host device 202, a challenge including a request for a cryptographic property of a code of the client device 204, e.g., a digest or signature or MAC of the code. The response module 224 can process the challenge to determine the request. The response module 224 can obtain a cryptographic property of the code based on information from the memory 222 including the stored code and/or associated information and send back a response including the obtained cryptographic property of the code. For example, if the challenge requests a signature of the code, the response module 224 can calculate a digest of the code and create a signature of the digest with a private key. If the challenge requests a cryptographic property of a particular portion of the authorized code, the response module 224 can identify a corresponding portion of the code and obtain the cryptographic property of the corresponding portion of the code.

In some implementations, the client device 204 includes secure storage 226 for storing secure information such as secrets or authentication keys (AuthKey) 225. The secure storage 226 can have security capability similar to the secure storage 216. The authentication keys 225 can include symmetric cryptographic keys or asymmetric cryptographic keys. The authentication keys 225 can include a public key or a private key. The client device 204 can use the authentication keys 225 for secure authentication and/or communication with the host device 202. In some cases, the response module 224 generates a MAC of a response (e.g., a digest or signature of the code) using the stored authentication key 225. The host device 202 can authenticate the response using an authentication key stored in the secure storage 216 and corresponding to the authentication key 225 to make sure that the response has not been modified during transmission. In some cases, the response module 224 generates a keyed MAC (e.g. HMAC or CMAC or others) of a code or a selected code portion using an encryption algorithm (e.g., a symmetric encryption algorithm) with the authentication key 225. The response module 224 sends the keyed MAC to the host device 202, and the host device 202 validates the keyed MAC using a stored authentication key corresponding to the authentication key 225.

In some implementations, the secure storage 226 is included in the processor 220 with higher security capabilities than other components of the processor 220. In some implementations, the secure storage 226 is separate from the processor 220 and coupled to the processor 220. The client device 204 can include the processor 220, the memory 222 storing a copy of the code, and the response module 224 for responding to challenges from the host device 202.

In some implementations, the secure storage 226 and the response module 224 are both included in a secure device 230 separated from the processor 220. The secure device 230 can be coupled to the client device 204 through a suitable interface. Such a configuration may allow a client device, which is not pre-configured with appropriate security features, to communicate with the host device 202 such that the host device 202 can perform controlled secure code authentication of the client device 204.

In a first example, the host device 202 sends a challenge for a property of a code of the client device 204. The processor 220 or the response module 224 computes a response (e.g., a digest of the code) based on information stored in the memory 222 an sends the response back to the host device 202. The response module 224 can have a higher computation capability than the processor 220 to accelerate the response computation or calculation. The host device 202 validates the response using a signature or a digest of the authorized code stored within the secure storage 216. If the host device 202 determines that the response is invalid, that is, the code stored within the client device 204 is not authorized, the host device 202 can isolate the client device 204 and prevent an outside environment (e.g., the network 102, the computing devices 106a, 106b, or the server computing system 108 of FIG. 1) from accessing or making use of the client device 204. On the contrary, if the host device 202 determines that the response is valid, that is, the code stored within the client device 204 is authorized, the host device 202 can allow the outside environment to access or make use of the client device 204.

In a second example, the host device 202 sends a challenge for a digest of a code of the client device 204. The processor 220 or the response module 224 computes the digest of the code based on information stored in the memory 222. The secure device 230 calculates a signature based on the computed digest of the code and a private key stored in the secure storage 226, and sends back the signature to the host device 202. The host device validates the signature and trusts the client device 204 based on a cryptographic key corresponding to the private key of the client device 204 or a certificate of the private key that has been used for signing.

In a third example, the host device 202 sends a challenge and a signature of a code of the client device 204. The signature can be an OEM signature of the code. The processor 220 or the response module 224 computes the digest of the code based on information stored in the memory 222. The secure device 230 then validates the computed digest against the received signature. The secure device 230 can send a result of the validation in the response to the host device 202. In some implementations, the secure device 230 stores information associated with the authorized code, performs code authentication for the code of the client device, and returns an authentication result to the host device 202.

If the secure device 230 determines that the computed digest is invalid, that is, the code stored within the client device 204 is not an authorized code, the secure device 230 prevents the outside environment (e.g., the network 102, the computing devices 106a, 106b, or the server computing system 108 of FIG. 1) from accessing or making used of the client device 204. In some embodiments, the host device 202 servers as an enabler for the client device 204. Until the host device 202 sends a challenge to the client, the client is prevented from doing anything other than waiting for the challenge. If the secure device 230 determines that the computed digest is valid, the secure device 230 enables the client device 204. In some cases, the client device 204 includes a pin coupled to an output of the secure device 230. Upon authentication of the code stored in the client device 204, the secure device 230 sends a control signal to the pin to enable the client device 204. In some examples, the pin is a hardware pin, and the control signal is an electrical signal that powers on or enables specific hardware blocks in the client device 204. In some implementations, the client device 204 includes a pin coupled to the connection 208. Upon authentication of the code on the client device by the host device 202, a control signal can be sent, e.g., by the host device 202, to the pin through the connection 208 to further enable the client device 204. In some cases, the secure device 230 enables the client device 204 by allowing the client device 204 to use the authentication keys 225 for communications, e.g., with the host device 202 or the outside environment.

Although the system 200 shows a host-client configuration with a single client device 204 to a single host device 202, other configurations are also possible. In some implementations, the system 200 is similar to the system 110 of FIG. 1 and includes multiple client devices that are connected to a single host device. The host device performs controlled secure code authorization for each of the client devices, as described with reference to FIG. 4. A connection, e.g., the connection 208, may be shared among the multiple client devices, or the connection may be replicated for each client device connected to the host device.

Figure 2B:
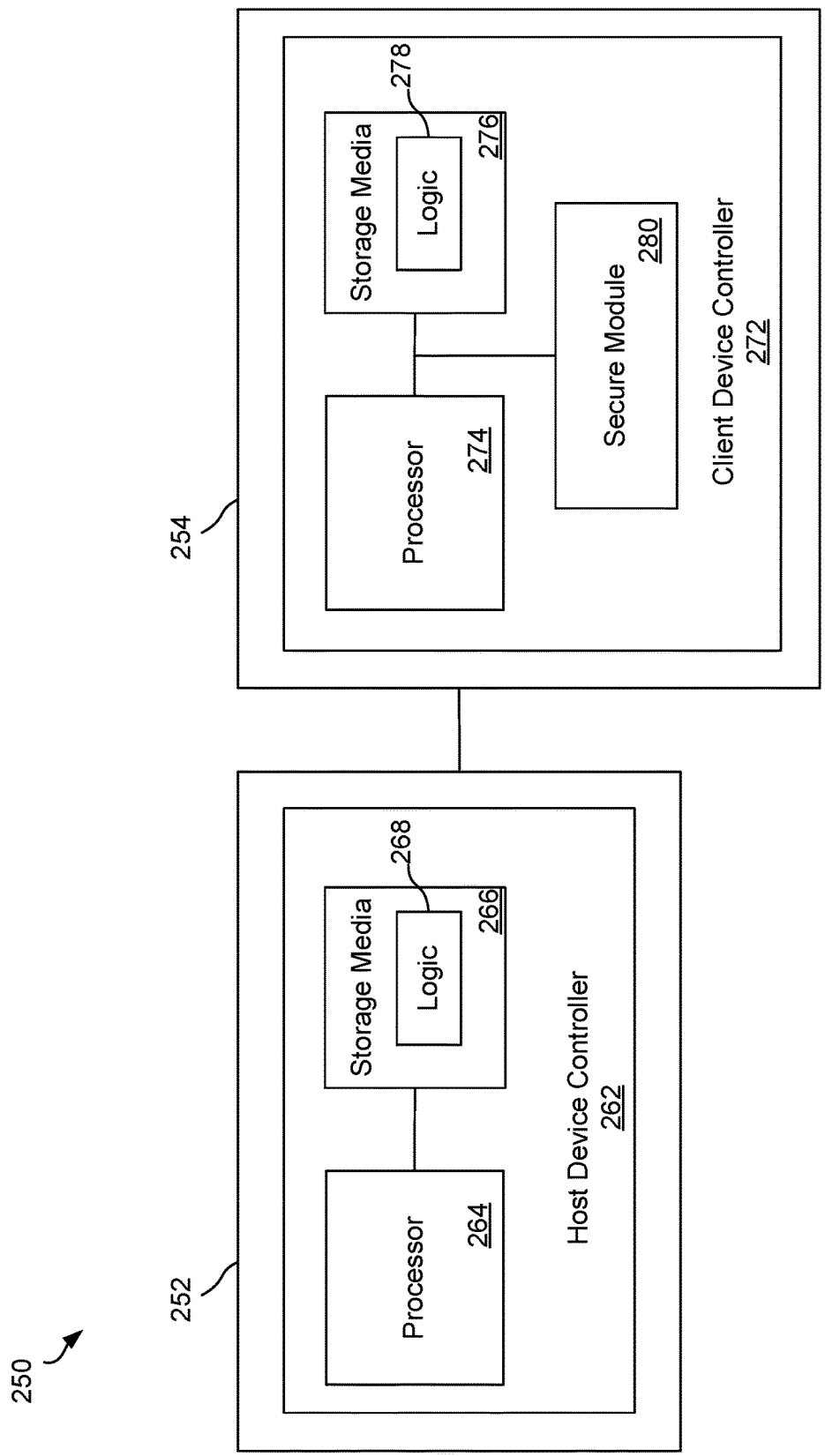
FIG. 2B is a block diagram of another example system including an example host device performing controlled secure code authentication of an example client device, according to an example embodiment.

FIG. 2B is a block diagram of another example system 250, according to an implementation. The system 250 includes a host device 252 and a client device 254. The host device 252 can be similar to the host device 202 of FIG. 2A. The client device 254 can be similar to the client device 204 of FIG. 2A.

The host device 252 has a host device controller 262 that includes a processor 264 and one or more storage media 266 coupled to the processor 264. The storage media 266 further stores logic 268 configured to cause the processor 264, when executed by the processor 264, to perform actions, e.g., secure code authentication of the client device 204. In one embodiment, the host device controller 262 includes the random generation module 214, the challenge generation module 212, and the authentication module 218 of FIG. 2A. In another embodiment, the host device controller 252 also includes the secure storage 216 of FIG. 2A.

The client device 254 has a client device controller 272 that includes a processor 274 and one or more storage media 276 coupled to the processor 274. The storage media 276 further stores logic 278 configured to cause the processor 274, when executed by the processor 274, to perform actions, e.g., responding to challenges from the host device 252 and/or secure code authentication of the client device 254. The client device controller 272 can include a secure module 280 that is similar to the secure device 230 of FIG. 2A. In one embodiment, the client device controller 272 includes the processor 220 and the memory 222 of FIG. 2A. In another embodiment, the client device controller 272 includes the response module 224 and/or the memory 222 of FIG. 2A. In another embodiment, the client device controller 272 includes the secure device 230 that has the response module 224 and the secure storage 226 of FIG. 2A.

Example Flowcharts

Figure 3:
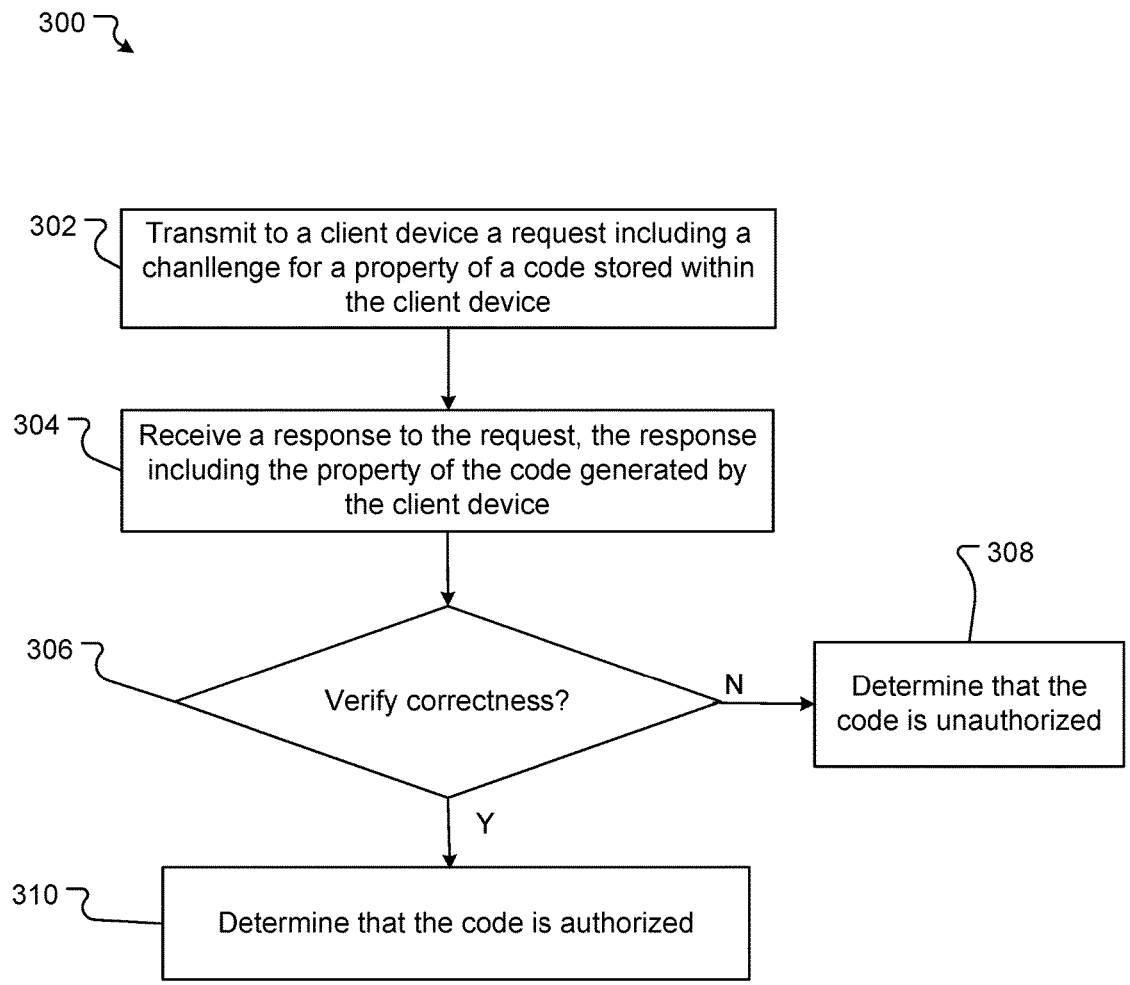
FIG. 3 is a flow diagram of an example process by which a host device may perform secure code authentication of a client device, according to an example embodiment.

FIG. 3 is a flow diagram of an example process 300 performed by a host device, e.g., the host device 112 of FIG. 1 or the host device 202 of FIG. 2A or the host device 252 of FIG. 2B. The host device performs controlled secure code authentication on a client device, e.g., the client device 116a, 116b, or 116n of FIG. 1 or the client device 204 of FIG. 2A or the client device 254 of FIG. 2B.

The host device sends to the client device a request including a challenge for a property of a code of the client device (302). The code can be a boot code for the client device to start up or an operation code for the client device to perform an operation. The property can be a digest, a signature, or a MAC of the code. The host device can include a secure storage, e.g., the secure storage 216 of FIG. 2A, to store information associated with an authorized code corresponding to the code of the client device. As noted above, the host device can store an entire copy (or image) of the authorized code, a digest of the authorized code, a signature of the authorized code such as an OEM signature, or a MAC of the authorized code, or other properties of the authorized code. The host device can also store information associated with one or more individual portions of the authorized code.

In some implementations, the host device receives a message informing the host device that the client device is to perform an operation. For example, when the client device is reset or whenever power is removed from the client device, the client device repeats a boot process, which can trigger the client device to send a message to the host device that rebooting has occurred on the client device. In response to receiving the message, the host device can send a challenge to the client device for a property of an authorized code corresponding to the operation.

In some examples, the host device initiates a code authentication process with the client device on a regular basis, e.g., a predetermined schedule. If the code authentication process does not occur according to the predetermined schedule, the host device can mark the client device as untrusted or initiate a challenge to request the client device to verify its trustworthiness. For example, power cycling of the client device causes the client device to repeat the booting operation in a predetermined schedule, which triggers the client device to send a message to the host device in the predetermined schedule. However, when the power cycling does not happen according to the predetermined schedule, for example, the power cycling is modified or changed, the host device can send an authorization request to the client device, e.g., using a cryptographic key. In response to receiving correct authorization information from the client device, the host device sends the challenge to the client device. Otherwise, if the authorization fails, the host device can prohibit the client device from accessing a network (e.g., the network 102 of FIG. 1) and/or send a warning or notification to an entity (e.g., a trusted entity) associated with the host device or the client device.

The host device receives a response to the request from the client device (304). The response can include a cryptographic property of the code generated by the client device based on the code stored within the client device. In some examples, the challenge includes a request for a digest of the code. The client device can calculate a digest of the code and send the digest of the code in the response to the host device. In some examples, the challenge includes a request for a signature of the authorized code. The client device can create a signature based on a digest of the code and a private key stored in the client device. The host device can store a secret or authentication key corresponding to the private key stored in the client device. The host device can also store a certificate of the private key that has been used for signing.

In some implementations, the host device sends a query (e.g., a nonce query) to the client device, together with or included in the challenge. As noted above, the query can be generated by a random number generator, e.g., the random generation module 214 of FIG. 2. The host device can receive a response from the client device and determine whether the received response includes information associated with the query. In some examples, the client device generates a digest of the code, then hashes the digest with the nonce, and includes the hashed digest in the response to the host device. If the host device determines that the response does not include the information associated with the query, the host device can stop the code authentication process and/or send a warning or notification to an entity associated with the host device or the client device. If the host device determines that the response includes the information associated with the query, the process 300 proceeds to step 306.

The host device verifies whether the response is correct based on the stored information of the authorized code (306). The host device can obtain the cryptographic property of the authorized code based on the information of the authorized code stored in the secure storage and determine whether the cryptographic property of the code in the response matches the obtained cryptographic property of the authorized code.

As noted above, the client device can include a secure module. The secure module can calculate a signature of the code based on a digest of the code and a private key stored in the secure module and include the signature in the response. If the response includes the signature of the code, the host device can create a signature based on a digest of the authorized code and a cryptographic key stored in the secure storage. The cryptographic key can be a public key corresponding to a private key stored in a secure device associated with the client device. The signature of the code can be generated using the private key. The host device can also create the signature using a certificate of the private key that has been used by the client device for signing. The host device can determine whether the created signature of the authorized code matches with the signature of the code in the response. If the host device determines that the created signature of the authorized code matches with the signature of the code in the response, the host device determines that the response is correct. If the host device determines that the created signature of the authorized code does not match with the signature of the code in the response, the host device determines that the response is incorrect.

If the host device verifies incorrectness of the response, the host device determines that the code is unauthorized (308), that is, the code stored within the client device is not the authorized code. Accordingly, the host device can isolate the client device from a network or prevent an outside environment from accessing or making use of the client device. The host device can send a warning or notification to an entity associated with the host device or the client device. The host device can also notify the entity or the client device to update the code stored within the client device, e.g., by downloading a new copy of the authorized code from a secure source to the client device.

If the host device verifies correctness of the response, the host device determines that the code is authorized (310), that is, the code stored within the client device is the authorized code. Accordingly, the host device can enable the client device. In some examples, in response to determining that the code is authorized, the host device activates a pin coupled to the client device to enable the client device to perform the operation.

In response to determining that the code is authorized, the host device can apply a security policy for sequential communication with the client device. The policy can include a symmetric key authorization or asymmetric key authorization. The code can be a boot code. In some examples, a symmetric key stored in the client device is enabled during secure boot, and runtime connection between the host device and the client device can be authenticated or encrypted using the stored symmetric key. In some examples, each time after the client device completes secure boot successfully, the host device transfers a new asymmetric key (e.g., a private key) to the client device using an asymmetric key exchange or agreement or other cryptographic method. The host device can store a corresponding asymmetric key (e.g., a public key) in the secure storage.

In some implementations, the host device stores an entire image of the authorized code in the secure storage. The host device can select a plurality of portions from the authorized code and calculate one or more cryptographic properties of each portion. For example, for each portion, the host device can compute a digest of the portion, e.g., using a cryptographic hash function, and/or create a signature of the portion using the computed digest and a secret or authentication key. The host device can also determine an address range of the computed digest and associate the address range with the digest and/or signature in the secure storage. In some implementations, the host device stores information associated with the plurality of portions of the authorized code, e.g., digests, signatures, and/or address ranges, without storing an entire image of the authorized code.

In some implementations, the host device selects a plurality of memory address ranges for a plurality of portions of authorized code. For example, the authorized code includes a starting address and an ending address. The host device can randomly select multiple pairs of starting address and ending address to use as the plurality of memory address ranges. Each memory address range corresponds to a particular portion of the authorized code. The host device determines a corresponding portion for each address range based on the address range of the authorized code, and calculates a respective digest for each portion. Then the host device stores the calculated digests and respective address ranges in the secure storage and associates the respective address range with the respective digest for each portion in the secure storage.

The host device can select, e.g., randomly, a particular portion of the authorized code and generate a challenge for requesting a cryptographic property of the particular portion. The challenge can include an address range associated with the particular portion. The client device can process the challenge to determine the address range. The client device can select a portion of the code stored within the client device having the address range, generate the property of the portion of the code, and include the generated property of the portion of the code in the response. The host device can verify correctness of the response to the challenge by determining that the response includes information corresponding to the particular portion of the authorized code. Each time the host device can select a different portion from the plurality of portions for the challenge.

The host device can update a copy of an authenticate code for the client device, e.g., by downloading from a secure source, and store the updated copy in secure storage associated with the host device. The client device can also update the authorized code, e.g., from the same secure source or from the host device. The host device can store a particular portion of the new authorized code, e.g., based on criticality of the particular portion and/or storage availability of the host device. Each time, the host device can vary an extent of the new authorized code to be included in the particular portion. In some implementations, the host device generates a challenge for requesting a cryptographic property of the particular portion and/or a cryptographic property of an entire image of the authorized code. For example, the challenge can include a request for a digest of the particular portion and the entire image of the authorized code.

In some implementations, the challenge includes a request for a message authentication code (MAC). The challenge can also include a nonce. The client device generates a client-side MAC based on a code stored within the client device and a secret key (e.g., stored in the secure storage 226 of FIG. 2) and/or the nonce, and sends the generated client-side MAC to the host device. The host device generates a host-side MAC based on an authenticate code stored in the host device and a secret key and/or the nonce. The secret key can be a shared validating key with the client device. The host device compares the client-side MAC in the response with the generated host-side MAC to determine whether the code stored in the client device is authorized or not.

In some implementations, the host device sends a challenge with a signature of an authorized code corresponding to the code of the client device. A secure module of the client device can calculate a signature of the code based on a private key stored in the secure module and validate that the calculated signature using the signature of the authorized code. The client device can include a result of the validation in the response. The host device can determine whether the code stored within the client device based on the received result of the validation.

Figure 4:
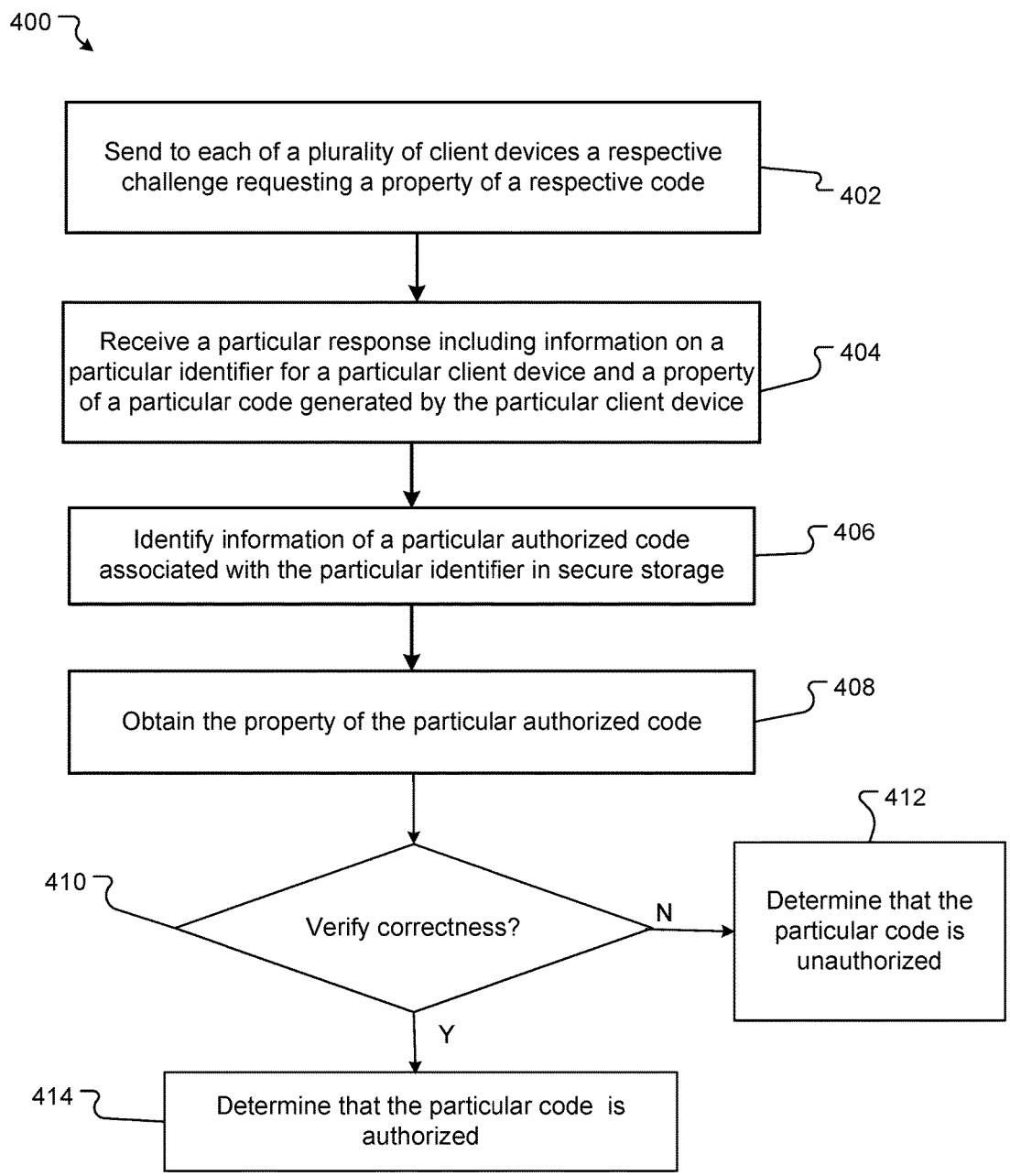
FIG. 4 is a flow diagram of an example process by which a host device may perform secure code authentication of a plurality of client devices, according to an example embodiment.

FIG. 4 is a flow diagram of an example process 400 performed by a host device to perform controlled secure code authentication on a plurality of client devices. The host device can be similar to the host device 112 of FIG. 1 or the host device 202 of FIG. 2A or the host device 252 of FIG. 2B, and each client device can be similar to the client device 116*a*, 116*b*, or 116*n* of FIG. 1 or the client device 204 of FIG. 2A or the client device 254 of FIG. 2B.

The host device sends to each of a plurality of client devices a respective challenge for requesting a property of a respective code for the client device (402). The host device can include a secure storage, e.g., the secure storage 216 of FIG. 2, for storing information of respective authorized codes corresponding to the codes of the client devices and associated identifiers of the client devices. Each client device can be coupled to the host device through a network, e.g., the network 114 of FIG. 1. For each client device, the secure storage can store information on a number of portions of the respective authorized code. The respective challenges for different client devices can be different. For example, different challenges can request different portions of the respective authorized codes for the different client devices.

The host device receives a particular response to a particular challenge (404). The particular response includes information on a particular identifier of a particular client device and a cryptographic property of a particular code stored within the particular client device. For example, the particular client device can receive a challenge for a digest of a respective authorized code. The particular client device can generate a digest of the particular operation code and create a signature using the digest and the particular identifier of the particular client device. The particular client device then sends the created signature in the particular response to the host device. The particular client device can also generate a signature using the digest and include the signature and the particular identifier in the particular response.

The host device identifies information of a particular authorized code associated with the particular identifier in the secure storage (406). The host device can analyze the particular response to obtain the particular identifier. Based on the particular identifier, the host device can identify information of a particular authorized code associated with the particular identifier stored in the secure storage.

The host device obtains the cryptographic property of the particular authorized code (408). For example, the host device can generate the cryptographic property of the particular authorized code based on the identified information of the particular authorized code in the secure storage.

The host device verifies whether the response is correct (410). The host device can determine whether the obtained cryptographic property of the particular authorized code matches with the cryptographic property of the particular code in the particular response.

If the obtained cryptographic property of the particular authorized code does not match with the cryptographic property of the particular code in the particular response, the host device verifies incorrectness of the particular response and determines that the code stored within the particular client device is unauthorized (412). The host device can isolate an outside environment from accessing or making use of the particular client device and/or send a message or notification to an entity associated with the host device or the particular client device. The host device can also send a notification to the client device or the entity to update the code stored within the client device.

If the obtained cryptographic property of the particular authorized code matches with the cryptographic property of the particular code in the particular response, the host device verifies correctness of the particular response and determines that the code of the particular client device is authorized (414). The host device can enable the particular client device as noted above.

Example Concepts

In view of the foregoing, it is noted that the present technology may be implemented, for example, in accordance with the following example concepts:

1. A device includes a processor and one or more storage media coupled to the processor and storing logic configured to cause the processor, when executed by the processor, to: transmit a request to a client device, the request including a challenge for a property of a code stored within the client device; receive a response to the request, the response comprising information associated with the property of the code, the information being generated by the client device based on the code; verify correctness of the response based on the received information; and based on the verifying of the correctness of the response, determine that the code is an authorized code.

2. The device of Concept 1, where the challenge is for a digest of the code, and the response includes the digest of the code, the digest of the code generated by the client device, and the verification of the correctness of the response includes: obtaining a property of the authorized code based on information of the authorized code stored in a secure storage, the property of the authorized code including one of a digest of the authorized code and a signature of the authorized code; and validating the digest in the received response based on the obtained property of the authorized code.

3. The device of Concept 1, where the challenge is for one of a digest of the code and a signature of the code, the response includes the signature of the code, the signature of the code generated by the client device, and the verification of the correctness of the response includes: obtaining a signature of the authorized code based on information of the authorized code stored in a secure storage; and validating the signature included in the response based on the obtained signature of the authorized code.

4. The device of Concept 1, where the request includes a signature of the authorized code, and the verification of the correctness of the response includes: determining, based on the received information, that the client device validates the generated digest of the code using the signature in the request.

5. The device of Concept 1, where the challenge is for a message authentication code (MAC) of the code, the response includes the MAC of the code generated by the client device based on the code stored within the client device and a shared secret key stored within the client device, and the verification of the correctness of the response includes: calculating a MAC of the authorized code based on the authorized code stored in a secure storage and the shared secret key stored in the secure storage; and validating the MAC of the code in the response based on the calculated MAC of the authorized code.

6. The device of Concept 1, where the logic is configured to cause the processor to generate a nonce, the request includes the nonce and the challenge, and the verification of the correctness of the response includes: determining that the received information includes information associated with the nonce.

7. The device of Concept 1, where the logic is configured to cause the processor to select a plurality of memory address ranges of the authorized code; determine a respective portion of the authorized code for each of the plurality memory address ranges; calculate a respective digest of each determined portion; store the respective digests of the portions of the authorized code and the respective memory address ranges in a secure storage; and associate the respective memory address ranges with the respective digests of the portions in the secure storage.

8. The device of Concept 7, where the challenge includes a particular memory address range of the memory address ranges, the response includes a digest of a particular portion of the code generated by the client device based on the particular memory address range included in the challenge, and the verification of the correctness of the response includes: determining that the digest of the particular portion of the code generated by the client device matches with the digest of the portion of the authorized code having the particular memory address range.

9. The device of Concept 1, further including a secure storage configured to store information of the authorized code, and the information of the authorized code stored in the secure storage comprises at least one of a copy of the authorized code, a digest of the authorized code, a signature of the authorized code, and a message authentication code (MAC) of the authorized code.

10. The device of Concept 1, where the logic is configured to cause the processor to transmit a plurality of requests to a plurality of client devices, respectively, each request comprising a respective challenge for a property of a respective code of a respective client device; receive a particular response to a particular request, the particular response including an identifier of a particular client device and information associated with a property of a particular code of the particular client device, the information being generated by the client device based on the particular code stored within the particular client device; verify correctness of the particular response based on information of a particular authorized code associated with the identifier stored in a secure storage; and based on verifying correctness of the response, determine that the particular code stored within the particular client device is the particular authorized code.

11. A device includes one or more storage media coupled to a processor and storing logic configured to cause the processor, when executed by the processor, to: receive a request from a host device, the request including a challenge for a property of a code stored within the client device; generate the property of the code based on the code; and transmit a response including information associated with the generated property of the code to the host device.

12. The device of Concept 11, further including a secure module.

13. The device of Concept 12, where the property of the code includes a digest of the code, the secure module is configured to calculate a signature of the code based on the generated digest of the code and a cryptographic key stored in the secure module, and the response includes the calculated signature of the code.

14. The device of Concept 12, where the request includes a signature of an authorized code corresponding to the code, the secure module is configured to: calculate the signature based on the generated digest of the code and a cryptographic key stored in the secure module; and validate the calculated signature of the code using the signature of the authorized code in the received request, and the response includes a result of the validation.

15. The device of Concept 14, where the secure module is configured to, in response to the validation, enable the client device.

16. The device of Concept 12, where the property of the code is a message authentication code (MAC) of the code, and the secure module is configured to generate the MAC of the code based on the code stored within the client device and a shared secret key stored in the secure module.

17. The device of Concept 12, where the secure module is configured to generate a MAC of a digest of the code using a shared secret key stored in the secure module.

18. The device of Concept 11, where the logic is configured to cause the processor to determine that the received request includes a nonce; and hash the generated property of the code with the nonce, and the response includes the hashed property of the code.

19. The device of Concept 11, where the logic is configured to cause the processor to: determine that the received challenge includes a memory address range; select a portion of the code stored within the client device having the memory address range; and generate the property of the selected portion of the code, and the response includes the generated property of the selected portion of the code.

20. The device of Concept 11, where the logic is configured to cause the processor to include an identifier of the client device in the response.

21. A non-transitory computer-readable storage medium coupled to one or more processors and having instructions stored thereon which, when executed by the one or more processors, cause the one or more processors to perform operations including: transmitting, by a host device, a request to a client device, the request including a challenge for a property of a code stored within the client device; receiving, by the host device, a response to the request, the response including information associated with the property of the code, the information being generated by the client device based on the code; verifying, by the host device, correctness of the response based on the received information; and based on the verifying of the correctness of the response, determining, by the host device, that the code is an authorized code.

22. The computer-readable storage medium of Concept 21, where the challenge is for a digest of the code, the response includes the digest of the code, the digest of the code generated by the client device, and the verifying of the correctness of the response includes: obtaining a property of the authorized code based on information of the authorized code stored in a secure storage, the property of the authorized code including one of a digest of the authorized code and a signature of the authorized code; and validating the digest in the received response based on the obtained property of the authorized code.

23. The computer-readable storage medium of Concept 21, where the challenge is for one of a digest of the code and a signature of the code, the response includes the signature of the code, the signature of the code generated by the client device, and the verifying of the correctness of the response includes: obtaining a signature of the authorized code based on information of the authorized code stored in a secure storage; and validating the signature included in the response based on the obtained signature of the authorized code.

24. The computer-readable storage medium of Concept 23, where the client device generates the signature of the code based on the digest of the code stored within the client device and a private key stored within the client device, and where the obtaining the signature of the authorized code includes calculating the signature of the authorized code using a digest of the authorized code and a cryptographic key stored in the secure storage and corresponding to the private key.

25. The computer-readable storage medium of Concept 21, where the request includes a signature of the authorized code, and the verifying correctness of the response includes: determining, based on the received information, that the client device validates the generated digest of the code using the signature in the request.

26. The computer-readable storage medium of Concept 21, where the challenge is for a message authentication code (MAC) of the code, the response includes the MAC of the code, the MAC of the code generated by the client device based on the code stored within the client device and a shared secret key stored within the client device, and the verifying correctness of the response includes: calculating a MAC of the authorized code based on the authorized code stored in a secure storage and the shared secret key stored in the secure storage; and validating the MAC of the code in the response based on the calculated MAC of the authorized code.

27. The computer-readable storage medium of Concept 21, where the operations further include generating a nonce, the request includes the nonce and the challenge, and the verifying correctness of the response includes: determining that the received information includes information associated with the nonce.

28. The computer-readable storage medium of Concept 21, where the operations further include selecting a plurality of memory address ranges of the authorized code; determining a respective portion of the authorized code for each of the plurality memory address ranges; calculating a respective digest of each determined portion; storing the respective digests of the portions of the authorized code and the respective memory address ranges in a secure storage; and associating the respective memory address ranges with the respective digests of the portions in the secure storage.

29. The computer-readable storage medium of Concept 28, where the challenge includes a particular memory address range of the memory address ranges, where the response includes a digest of a particular portion of the code generated by the client device based on the particular memory address range included in the challenge, and where the verifying of the correctness of the response includes determining that the digest of the particular portion of the code generated by the client device matches with the digest of the portion of the authorized code corresponding to the particular memory address range.

30. The computer-readable storage medium of Concept 21, where the code of the client device includes one of: a boot code configured, when executed, to cause the client device to execute a boot operation, and an operation code configured, when executed, to causer the client device to perform an operation corresponding to the operation code.

31. The computer-readable storage medium of Concept 21, where the host device includes a secure storage configured to store information of the authorized code, and the information of the authorized code stored in the secure storage comprises at least one of a copy of the authorized code, a digest of the authorized code, a signature of the authorized code, and a message authentication code (MAC) of the authorized code.

32. The computer-readable storage medium of Concept 21, where the response includes a MAC of a digest of the code generated by the client device based on the digest generated by the client device and a shared secret key stored within the client device, and the verifying correctness of the response includes: calculating a MAC of a digest of the authorized code based on the authorized code stored in a secure storage and the shared secret key stored in the secure storage; and validating the MAC of the digest of the code in the response based on the calculated MAC of the digest of the authorized code.

It is noted that the foregoing example concepts are presented for purposes of illustration, and that the present technology is not limited to these example concepts.

Particular embodiments of the subject matter described in this specification can be implemented so as to realize one or more of the following advantages. By using a trusted or secured host device to perform controlled secure code authentication on a client device, the security of a host/client network can be improved by the security of the host device. As the host device can have security capabilities greater than the client device, for example, the host device can have secure storage, high computation ability, and random number generator that are unavailable on the client device, security of operations on the client device can be increased and fraudulent operations can be avoided or minimized. The host-controlled secure code authentication can ensure that a client code stored in the client device is an authenticate code, e.g., as intended by an OEM, and that malware does not run on the client device. Also, as the host device performs the authentication, the host device can have a faster processor to improve a speed of the authentication compared to the client device itself performing local authentication. The client device can be made with low security capabilities, e.g., without secure storage against attacks and/or without high performance logic, thus can be made with low cost. The host device can store an entire code image for the client device, which can simplify code updates for the client device by concentrating the networking in the host device and eliminating the need for extra memory in the client device as the code can be recovered if an update fails. With the host-controlled secure code authentication, even if the client device provides weak protection, a user can trust the client device. For example, even if an entire memory is known or is able to be modified by an attacker, the integrity of the code can be ensured. In another example, even if a boot code of the client device cannot be properly protected, secure booting of the client device can be implemented. The host device can be used to perform secure code authentication on a number of client devices, which can be very effective. If the client devices are duplicated devices, the host device can manage or authenticate their code with just a single image of the code. The controlled secure code authentication can be applied in different environments, e.g., in a car system, a home network, or a medical device system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A non-transitory computer-readable storage medium having instructions stored thereon which, when executed by one or more processors, cause the one or more processors to perform operations comprising:

transmitting, from a host device, a request to a client device, the request including a challenge for a property of a code stored within the client device that is to be authorized by the host device, wherein the host device has a security capability greater than the client device and is configured to control secure authorization of the code stored within the client device;

receiving, at the host device, a response to the request, the response comprising information associated with the property of the code, but without receiving a copy of the code from the client device;

verifying, by the host device, correctness of the response based on the received information associated with the property of the code stored within the client device that is to be authorized by the host device and information of an authorized code that is stored in a secure storage associated with the host device before the request is transmitted from the host device to the client device; and determining, by the host device and based on the verifying of the correctness of the response, that the code stored within the client device is authorized, wherein the host device comprises the secure storage configured to store the information of the authorized code, and wherein the information of the authorized code comprises at least one of a copy of the authorized code, a digest of the authorized code, a signature of the authorized code, and a message authentication code (MAC) of the authorized code.

2. The computer-readable storage medium of claim 1, wherein the challenge is for a digest of the code, wherein the response includes the digest of the code, the digest of the code generated by the client device, and wherein the verifying of the correctness of the response comprises:

obtaining a property of the authorized code based on information of the authorized code stored in a secure storage, the property of the authorized code including one of a digest of the authorized code and a signature of the authorized code; and validating the digest in the received response based on the obtained property of the authorized code.

3. The computer-readable storage medium of claim 1, wherein the challenge is for one of a digest of the code and a signature of the code, wherein the response includes the signature of the code, the signature of the code generated by the client device, and wherein the verifying of the correctness of the response comprises:

obtaining a signature of the authorized code based on information of the authorized code stored in a secure storage; and validating the signature included in the response based on the obtained signature of the authorized code.

4. The computer-readable storage medium of claim 3, wherein the client device generates the signature of the code based on the digest of the code stored within the client device and a private key stored within the client device, and wherein the obtaining the signature of the authorized code comprises:

calculating the signature of the authorized code using a digest of the authorized code and a cryptographic key stored in the secure storage and corresponding to the private key.

5. The computer-readable storage medium of claim 1, wherein the request includes a signature of the authorized code, and wherein the verifying correctness of the response comprises:

determining, based on the received information, that the client device validates the generated digest of the code using the signature in the request.

6. The computer-readable storage medium of claim 1, wherein the challenge is for a message authentication code (MAC) of the code, wherein the response includes the MAC of the code, the MAC of the code generated by the client device based on the code stored within the client device and a shared secret key stored within the client device, and wherein the verifying correctness of the response comprises:

calculating a MAC of the authorized code based on the authorized code stored in a secure storage and the shared secret key stored in the secure storage; and validating the MAC of the code in the response based on the calculated MAC of the authorized code.

7. The computer-readable storage medium of claim 1, wherein the operations further comprise generating a nonce, wherein the request includes the nonce and the challenge, and wherein the verifying correctness of the response comprises:

determining that the received information includes information associated with the nonce.

8. The computer-readable storage medium of claim 1, wherein the operations further comprise selecting a plurality of memory address ranges of the authorized code;

determining a respective portion of the authorized code for each of the plurality memory address ranges;

calculating a respective digest of each determined portion;

storing the respective digests of the portions of the authorized code and the respective memory address ranges in a secure storage; and associating the respective memory address ranges with the respective digests of the portions in the secure storage.

9. The computer-readable storage medium of claim 8, wherein the challenge includes data indicating a particular memory address range of the memory address ranges, wherein the response includes a digest of a particular portion of the code generated by the client device based on the particular memory address range included in the challenge, and wherein the verifying of the correctness of the response comprises:

determining that the digest of the particular portion of the code generated by the client device matches with the digest of the portion of the authorized code corresponding to the particular memory address range.

10. The computer-readable storage medium of claim 1, wherein the code of the client device includes one of:
a boot code configured, when executed, to cause the client device to execute a boot operation, and
an operation code configured, when executed, to cause the client device to perform an operation corresponding to the operation code.

11. The computer-readable storage medium of claim 1, wherein the response includes a MAC of a digest of the code generated by the client device based on the digest generated by the client device and a shared secret key stored within the client device, and
wherein the verifying correctness of the response comprises:
calculating a MAC of a digest of the authorized code based on the authorized code stored in a secure storage and the shared secret key stored in the secure storage; and
validating the MAC of the digest of the code in the response based on the calculated MAC of the digest of the authorized code.

12. A host device controller comprising:
a processor; and
one or more storage media coupled to the processor and storing logic configured to cause the processor, when executed by the processor, to:
transmit a request to a client device, the request including a challenge for a property of a code stored within the client device that is to be authorized by the host device controller, wherein the host device controller has a security capability greater than the client device and is configured to control secure authorization of the code stored within the client device;
receive a response to the request, the response comprising information associated with the property of the code, but without receiving a copy of the code from the client device;
verify correctness of the response based on the received information associated with the property of the code stored within the client device that is to be authorized by the host device and information of an authorized code stored in a secure storage associated with the host device controller before the request is transmitted from the host device to the client device; and
based on the verifying of the correctness of the response, determine that the code stored within the client device is authorized,
wherein the host device controller comprises the secure storage configured to store the information of the authorized code, and wherein the information of the authorized code comprises at least one of a copy of the authorized code, a digest of the authorized code, a signature of the authorized code, and a message authentication code (MAC) of the authorized code.

13. The host device controller of claim 12, wherein the challenge is for a digest of the code,
wherein the response includes the digest of the code, the digest of the code generated by the client device, and
wherein the verification of the correctness of the response comprises:
obtaining a property of the authorized code based on information of the authorized code stored in a secure storage, the property of the authorized code including one of a digest of the authorized code and a signature of the authorized code; and
validating the digest in the received response based on the obtained property of the authorized code.

14. The host device controller of claim 12, wherein the challenge is for one of a digest of the code and a signature of the code,
wherein the response includes the signature of the code, the signature of the code generated by the client device, and
wherein the verification of the correctness of the response comprises:
obtaining a signature of the authorized code based on information of the authorized code stored in a secure storage; and
validating the signature included in the response based on the obtained signature of the authorized code.

15. The host device controller of claim 12, wherein the request includes a signature of the authorized code, and wherein the verification of the correctness of the response comprises:
determining, based on the received information, that the client device validates the generated digest of the code using the signature in the request.

16. The host device controller of claim 12, wherein the challenge is for a message authentication code (MAC) of the code,
wherein the response includes the MAC of the code generated by the client device based on the code stored within the client device and a shared secret key stored within the client device, and
wherein the verification of the correctness of the response comprises:
calculating a MAC of the authorized code based on the authorized code stored in a secure storage and the shared secret key stored in the secure storage; and
validating the MAC of the code in the response based on the calculated MAC of the authorized code.

17. The host device controller of claim 12, wherein the logic is configured to cause the processor to generate a nonce,
wherein the request includes the nonce and the challenge, and
wherein the verification of the correctness of the response comprises:
determining that the received information includes information associated with the nonce.

18. The host device controller of claim 12, wherein the logic is configured to cause the processor to:
select a plurality of memory address ranges of the authorized code;
determine a respective portion of the authorized code for each of the plurality memory address ranges;
calculate a respective digest of each determined portion;
store the respective digests of the portions of the authorized code and the respective memory address ranges in a secure storage; and
associate the respective memory address ranges with the respective digests of the portions in the secure storage.

19. The host device controller of claim 18, wherein the challenge includes data indicating a particular memory address range of the memory address ranges,
wherein the response includes a digest of a particular portion of the code generated by the client device based on the particular memory address range included in the challenge, and wherein the verification of the correctness of the response comprises:
  determining that the digest of the particular portion of the code generated by the client device matches with the digest of the portion of the authorized code having the particular memory address range.

20. The host device controller of claim 12, wherein the logic is configured to cause the processor to:
  transmit a plurality of requests to a plurality of client devices, respectively, each request comprising a respective challenge for a property of a respective code of a respective client device;
  receive a particular response to a particular request, the particular response comprising an identifier of a particular client device and information associated with a property of a particular code of the particular client device, the information being generated by the client device based on the particular code stored within the particular client device;
  verify correctness of the particular response based on information of a particular authorized code associated with the identifier stored in a secure storage; and
  based on verifying correctness of the response, determine that the particular code stored within the particular client device is the particular authorized code.

21. A method comprising:
  transmitting, by a host device, a request to a client device, the request including a challenge for a property of a code stored within the client device that is to be authorized by the host device, wherein the host device has a security capability greater than the client device and is configured to control secure authorization of the code stored within the client device;
  receiving, by the host device, a response to the request, the response comprising information associated with the property of the code, but without receiving a copy of the code from the client device;
  verifying, by the host device, correctness of the response based on the received information associated with the property of the code stored within the client device that is to be authorized by the host device and information of an authorized code stored in a secure storage associated with the host device before the request is transmitted from the host device to the client device; and
  based on the verifying of the correctness of the response, determining, by the host device, that the code stored within the client device is authorized,
  wherein the host device comprises the secure storage configured to store the information of the authorized code, and wherein the information of the authorized code comprises at least one of a copy of the authorized code, a digest of the authorized code, a signature of the authorized code, and a message authentication code (MAC) of the authorized code.

* * * * *